US008676404B2

(12) United States Patent
Marty et al.

(10) Patent No.: US 8,676,404 B2
(45) Date of Patent: Mar. 18, 2014

(54) CENTRALIZED NAVIGATION INFORMATION MANAGEMENT METHOD AND SYSTEM

(75) Inventors: Nicolas Marty, Saint Sauveur (FR); François Coulmeau, Seilh (FR); Fabien Guilley, Merenvielle (FR)

(73) Assignee: Thales, Neuilly sur Seine (FR)

( * ) Notice: Subject to any disclaimer, the term of this patent is extended or adjusted under 35 U.S.C. 154(b) by 586 days.

(21) Appl. No.: 12/979,404

(22) Filed: Dec. 28, 2010

(65) Prior Publication Data

US 2012/0029737 A1 Feb. 2, 2012

(30) Foreign Application Priority Data

Dec. 30, 2009 (FR) ..................................... 09 06399

(51) Int. Cl.
*G01C 23/00* (2006.01)
*G05D 1/00* (2006.01)

(52) U.S. Cl.
USPC .......... 701/3; 701/9; 701/10; 701/24; 701/36; 701/120; 244/75.1; 244/158.1; 340/425.5; 340/438; 340/439; 340/971; 340/974; 340/975; 340/963; 340/969; 340/945

(58) Field of Classification Search
USPC ........... 701/1, 3, 9, 10, 11, 13, 15, 18, 24, 29, 701/36, 120, 221; 244/158.1, 75.1; 340/425.5, 438, 439, 971, 973, 974, 340/975, 961, 963, 969, 945
See application file for complete search history.

(56) References Cited

U.S. PATENT DOCUMENTS

| | | | | |
|---|---|---|---|---|
| 7,026,956 | B1 * | 4/2006 | Wenger et al. | 340/971 |
| 7,289,890 | B2 * | 10/2007 | Mitchell et al. | 701/1 |
| 2007/0219679 | A1 * | 9/2007 | Coulmeau | 701/3 |
| 2008/0140269 | A1 | 6/2008 | Naimer et al. | |
| 2009/0115637 | A1 | 5/2009 | Naimer et al. | |
| 2010/0087969 | A1 | 4/2010 | Baude et al. | |

FOREIGN PATENT DOCUMENTS

| | | |
|---|---|---|
| EP | 1398698 | 3/2004 |
| FR | 2891069 | 3/2007 |
| FR | 2916067 | 11/2008 |

* cited by examiner

*Primary Examiner* — Thomas Tarcza
*Assistant Examiner* — Adam Tissot
(74) *Attorney, Agent, or Firm* — Baker Hostetler LLP

(57) ABSTRACT

In a centralized navigation information management system installed on board an aircraft which is in a current position at a current time, the aircraft having a warning management system and a route management system with means for creating a route plan, the route plan having a future route plan corresponding with the part of the route plan beginning at the current position and at the current time, the system includes: means for creating a task comprising at least one task parameter relating to an item of navigation information, including a task variable corresponding to a condition of execution of the said task, the means for creating a task having means for determining a predicted time meeting the execution condition; and means for detecting a possible inconsistency between the created task and the route plan or the future route plan and for transmitting, when an inconsistency is detected, a message relating to the inconsistency to a first display means of a centralized warning management system to display the inconsistency message on a first man-machine interface.

15 Claims, 7 Drawing Sheets

CENTRALIZED NAVIGATION INFORMATION MANAGEMENT METHOD AND SYSTEM

CROSS-REFERENCE TO RELATED APPLICATIONS

This application claims priority to foreign French patent application No. FR 09 06399, filed on Dec. 30, 2009, the disclosure of which is incorporated by reference in its entirety.

FIELD OF THE INVENTION

The present invention is in the field of onboard avionics. More particularly, the invention relates to a navigation aid method and system for an aircraft.

BACKGROUND OF THE INVENTION

For several years, consideration has been given to the problems related to the increase in air traffic and notably the large workload that this implies for aircraft crews. In concrete terms, the quantity of information to be taken into account and the number of tasks to be carried out by the crew is increasing whereas there is a tendency for the number of crew members to reduce.

Certain aircraft navigation aid systems make it possible to manage navigation instructions, coming from an air controller or from an airline company. The navigation instructions are tasks that the crew or the pilot must carry out. The management of these instructions is carried out by the intermediary of communication routers and their graphic interfaces. The instructions which have an impact on the running of the mission, for example on the flight plan, can be inserted in a semi-automatic or fully automatic manner in computers responsible for the management of the flight. However, the integration of these automatic procedures in the computers is costly and remains rather limited. Certain navigation instructions transmitted to the crew in the form of voice or numerical messages are taken into account in an entirely manual way. The same applies to the navigation aid items of information, for example the NOTAM (Notice To Air Men) messages which are notices broadcast by telecommunication and giving, with regard to the establishment, status or modification of a service, an aeronautical procedure or a danger to air navigation, items of information which it is essential to communicate on time to the personnel responsible for air operations. The crew must memorize these items of information in order to take account of them during their mission.

The crew is therefore working in an environment loaded with navigation information of different types (navigation instructions, navigation aid information) which is given to it on different media in a scattered manner. This does not facilitate the work of the crew which has to become aware of the different items of information simultaneously, identify the items of information useful for its mission, process them and sometimes even cross-reference these items of information in order to make good decisions in order to conduct its mission successfully. For example, the pilot is often called upon to make calculations mentally in order to check the compatibility of the items of information with the flight plan. The crew can notably be called upon to check if, on following its flight plan, it will not penetrate into a prohibited space which has been notified to it by a NOTAM. The processing of these items of information by the crew represents a risk factor because, on the one hand, it demands the attention of the crew and, on the other hand, it is approximate. It is moreover difficult for the crew to have a global vision of the actions which it has to carry out during its mission and to plan it work in order to distribute its workload in an optimum manner. This can result in forgetting tasks and can prejudice flight safety.

SUMMARY OF THE INVENTION

The present invention facilitates access to the items of navigation information useful to the crew during its mission and also to facilitate their processing by the crew.

The invention provides a centralized navigation information management system installed on board an aircraft which is in a current position at a current time, the aircraft comprising a warning management system and a route management system comprising means for creating a route plan, the route plan comprising a future route plan corresponding with the part of the route plan beginning at the current position and at the current time, the system comprising: means for creating a task comprising at least one task parameter relating to an item of navigation information, including a task variable corresponding to a condition of execution of the said task, the means for creating a task comprising means for determining a predicted time for meeting the execution condition; means for detecting a possible inconsistency between the created task and the route plan or the future route plan and for transmitting, when an inconsistency is detected, a message relating to the said inconsistency to first display means of a centralized warning management system in order to display an inconsistency message on a first man-machine interface.

The system according to the invention includes one or more of the following features, separately or in combination:

- task parameters having one or more validity periods and/or a type of variable and/or a context parameter and/or a type of task and/or a degree of urgency and/or a source of the task and/or a task instruction;
- an inconsistency with the route plan, or respectively the future route plan, is detected when the task variable does not intersect with the route plan, or respectively with the future route plan, or is situated at a distance greater than a predetermined distance from the flight path, or respectively from the future flight path;
- the task parameters comprise a task instruction corresponding to a prohibition, an inconsistency with the route plan, or respectively with the future route plan, being detected when the variable is comprised in the route plan, or respectively in the future route plan, or is situated at a distance less than a predetermined distance from the flight path, or respectively from the future flight path;
- an inconsistency is detected when in addition the task variable intersects the route plan, or respectively the future route plan, or is situated at a distance greater than a predetermined distance from the flight path, or respectively from the future flight path, during at least a period of flight and/or when in addition the context of the aircraft is different from the context parameter;
- the means for creating a task comprise means of interpretation for extracting at least one task parameter from a numerical instruction coming from a system external to the aircraft;
- the means for creating a task comprise a second man-machine interface making it possible for an operator to enter at least one task parameter and/or means for extracting at least one task parameter from a database;

- the route management system comprises an FMS flight management system and/or an OANS onboard airport navigation system;
- the means for determining the predicted time and/or the means for detecting the inconsistencies and/or the means of interpretation and/or the means for extracting task parameters from a database are included in the route management system or in the centralized task management system;
- the centralized warning management system furthermore comprises means of sequencing tasks in order to insert the created task in a list of sequenced tasks and second display means for displaying the said list of tasks on a third man-machine interface and/or furthermore comprises a task execution function;
- it comprises filtering means for filtering the tasks according to a filtering criterion depending on at least one task parameter in order to display only the tasks and/or the inconsistency messages complying with the filtering criterion.

The invention also provides a centralized navigation information management method for an aircraft which is in a current position at a current time, comprising a warning management system and a route management system comprising means for creating a route plan, the route plan comprising a future route plan corresponding with the part of the route plan beginning at the current position of the aircraft and at the current time, the method comprising: a step for creating a task comprising at least one task parameter relating to an item of navigation information, including a task variable corresponding to a condition of execution of the said task, the step for creating a task comprising a step for determining a predicted time of meeting the execution condition; a step for detecting a possible inconsistency between the created task and the route plan or with the future route plan and, when an inconsistency is detected, a step for displaying a message relating to the said inconsistency on a first man-machine interface.

Advantageously, the invention allows a centralized management of all the items of navigation information of which the crew must have knowledge during a mission. It has a global and chronological view of the tasks in progress or to be carried out during its mission, NOTAMS which can affect its mission and potential problems related to current NOTAMS, with their time limits, and can therefore optimize the taking into account of them during the flight. It is moreover warned of inconsistencies existing between the items of navigation information and the route plan (possibly future) which inform it about future risks. These items of information are made available to the crew in a centralized manner. The invention also allows better time planning of actions to be accomplished; the crew can thus, because of the invention, smooth its workload in order to avoid workload peaks.

The method and system according to the invention also make it possible to lighten the workload of the crew by automating, on the one hand, the creation of certain tasks and, on the other hand, by automatically executing those tasks that can be automated. Moreover, the crew no longer has to check if there are inconsistencies between the items of navigation information and the (future) route plan. The method and the system according to the invention make it possible to improve safety on board the aircraft.

BRIEF DESCRIPTION OF THE DRAWINGS

Other features and advantages of the invention will become apparent with the help of the following description, given by way of non-limiting example and with reference to the appended drawings in which.

DETAILED DESCRIPTION

Figure 1:
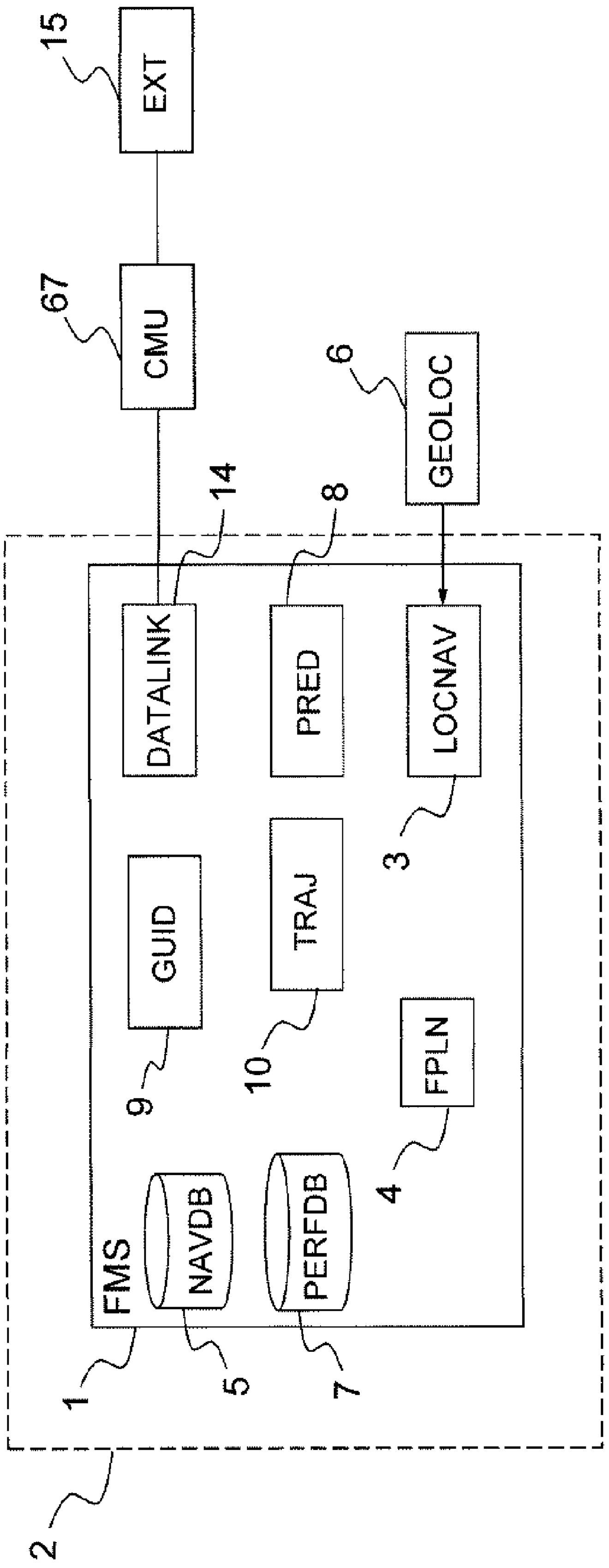
FIG. 1 is a block diagram of an example of a route management system comprising a flight management system.

An aircraft includes, as shown in FIG. 1, a route management system 2 having means for creating a route plan. In this figure, the route management system 2 comprises an FMS flight management system 1. The flight management system is implemented by a computer installed onboard an aircraft.

The FMS 1 includes:

- databases 5, 7 among which is a navigation database NAVDB 5 storing geographic points, beacons, interception segments, altitude segments; as well as a performance database PERFDB 7 notably containing performance data of the aircraft such as aerodynamic parameters and characteristics of the engines of the aircraft,
- location means LOCNAV, 3, for locating the aircraft geographically from data transmitted by geographic location means GEOLOC 6 installed onboard the aircraft,
- means 4, 8, 10, for constructing a flight plan that the aircraft is supposed to follow from its takeoff up to its landing, comprising:
  - flight plan management means 4, referenced FPLN, allowing an acquisition and for constructing a skeleton flight path to be followed by the aircraft (such as departure and arrival procedures, waypoints, air routes) on the basis of constraints stored in the navigation database,
  - means 8, 10, for constructing a flight path (having a lateral flight path and a vertical flight path) on the basis of data stored in the databases 5, 7 and managed by the flight plan management means 4, comprising means TRAJ 10 for constructing the lateral flight path on the basis of the geographical elements of the flight plan (stored in the navigation database and managed by the FPLN, 4), and complying with the aircraft performance; as well as means PRED 8 for constructing an optimized vertical flight path on the lateral flight path complying with the performance of the aircraft and the constraints stored in the navigation database NavDB,
- guidance means GUID 9 which provide, to an automatic pilot or to the pilot, flight instructions in order to guide the aircraft in the lateral and vertical planes in order to follow the flight path,
- digital data links, referenced DATALINK 14, allowing the FMS 1 to communicate with external systems EXT 15, by the intermediary of a communication management unit CMU 67 providing a bidirectional communication link between the aircraft and the ground control systems EXT, 15. The external systems EXT 15 are for example airline AOC (Air Operations Centres) centres, airline ATC (Air Traffic Control) centres and other aircraft. For greater clarity, the links between the elements of the flight plan have not been shown.

The flight plan comprises elements of the flight plan including the flight path comprising a lateral flight path (in a horizontal plane), a vertical flight path (in a vertical plane), the constraints contained in a navigation database NAVDB and elements managed by the flight plan management means 4. The means for constructing a flight plan are functions of the computer of the FMS.

The route management system 2 includes an OANS (On Board Airport Navigation System) system, which is not shown, whose function is to assist the crew during taxiing phases on complex airport surfaces. Conventionally, it comprises an airport database storing data relating to the geography of the airport, a function for producing a moving map representing the environment of the aircraft on the basis of the airport data. The OANS conventionally comprises digital data links allowing it to communicate with external systems EXT 15, by the intermediary of a CMU 67 as well as means for calculating routing plans on the departure and arrival airports. The routing plan comprises a departure/arrival routing plan comprising a departure/arrival routing (respectively corresponding to the path that the aircraft is presumed to have to follow on the ground at the departure/arrival airport). The route management system comprises an FMS and/or an OANS. In the case where the route management system comprises an OANS and an FMS, the FMS is active in flight (the route plan is then the flight plan) and the OANS takes over from the FMS on the ground (the route plan is then the departure or arrival routing plan). The means for establishing the route plan alternately comprise the means for establishing the flight plan and the means for establishing a routing plan.

Figure 2:
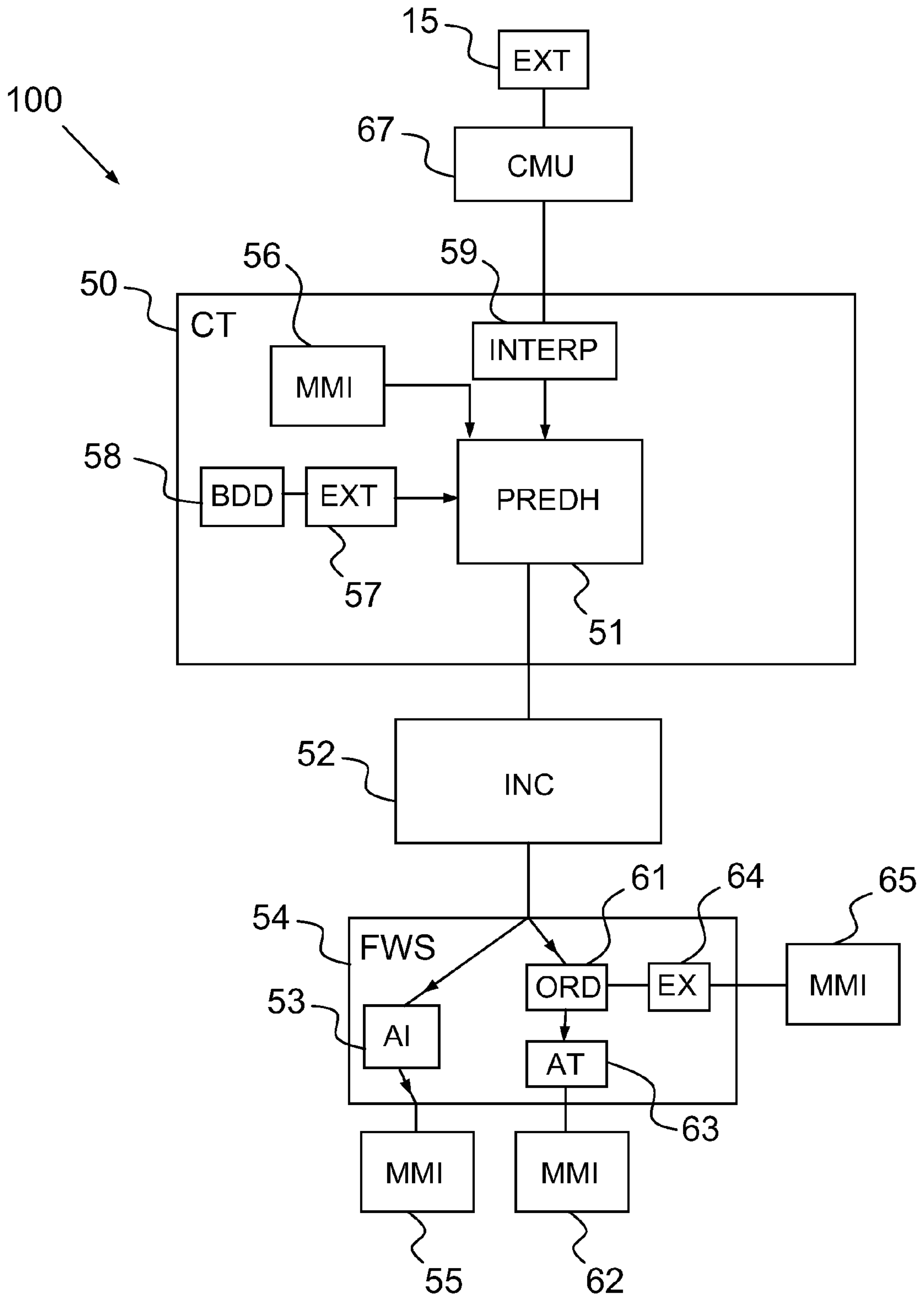
FIG. 2 is a block diagram of an example of a system according to the invention.

FIG. 2 shows the centralized navigation information management system 100 according to the invention including:

- means CT 50 for creating, on the basis of a piece of navigation information, a task comprising at least one task parameter, relating to a piece of navigation information, including a task variable corresponding to a condition for the execution of the said task and possibly an associated instruction, the said means CT 50 for creating a task comprising means PREDH 51 for determining a predicted time of completion of the execution condition,
- means INC 52 for detecting a possible inconsistency, between the created task and the route plan or with the future route plan, and of transmitting, when an inconsistency is detected, a message relating to the said inconsistency to first display means AI 53 of an FWS (Flight Warning System) system for displaying an inconsistency message on a first man-machine interface MMI, 55.

The means for detecting the inconsistencies INC 52 and for creating the task CT 50 are advantageously functions installed in one or more onboard computers as will be seen below.

Figure 3:
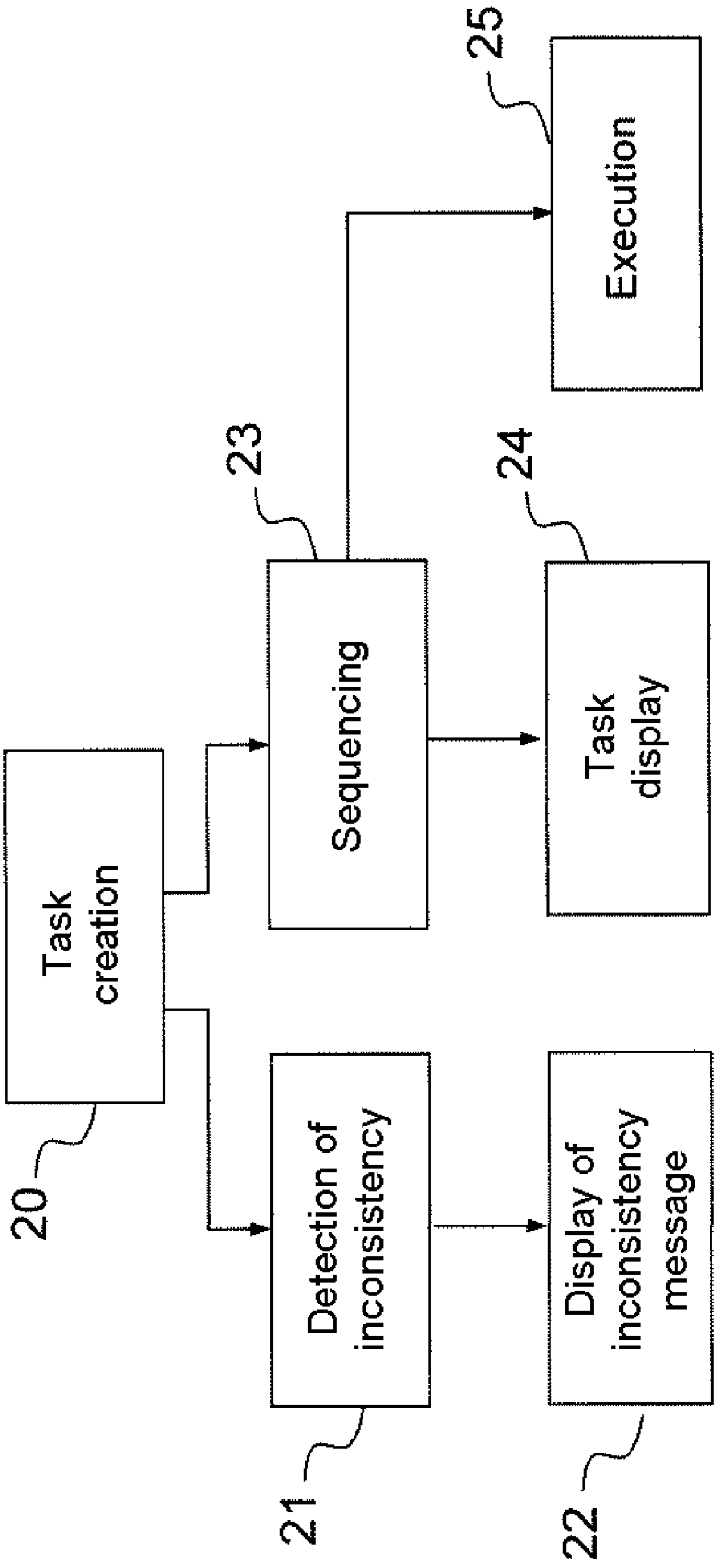
FIG. 3 is a flowchart of the principal steps of the method according to the invention.

FIG. 3 shows the steps of the method according to the invention which the system according to the invention is capable of implementing. The method according to the invention comprises a step 20 for creating a task in the form of a file comprising task parameters by means of the task creation means CT 50. The task parameters relating to a piece of navigation information comprise at least one task variable and possibly a task instruction associated with the task. A piece of navigation information can be a piece of information of the navigation instruction type or a piece of information of the navigation aid type, for example of the NOTAM type.

The task variables can belong to different types of variables. It can notably be a matter of position variables (for example a waypoint of the flight path presumed to have to be followed by the aircraft, a geographic position defined by a horizontal position and/or at an altitude, a reference to a position), geographic zones, times, speeds (for example a maximum operating speed VMO), major events of the mission (for example a particular phase of the flight, a guidance mode).

The variable corresponds to a condition for initiating the execution of the task. It represents a value of a magnitude corresponding to the type of variable. The navigation instructions (or flight clearances) generally correspond to one or more actions to be carried out when a condition is met, that is to say when a magnitude reaches the value specified by the variable. The variable can also correspond to the value of a magnitude, which is applicable to the associated information, at which the information must be known by the crew. For example, for the following NOTAM: "AIRSPACE R166B CLOSED" which means that the airspace called R166B is closed, the variable is a reference "Airspace R166B" to a geographic zone to which the NOTAM applies.

The instruction associated with the task can be an action or actions to be accomplished or a message associated with the information to be displayed. The information parameters can also comprise a type of task corresponding to the type of information on the basis of which the task is created (navigation instruction, NOTAM) and/or one or more periods of validity during which the information is valid. This period can for example be defined by a start and end date and time. A NOTAM can in fact inform that an airspace is closed during a given period defined by the period of validity. Other information parameters can be added to the task as an indicator of importance. For example a task can be: critical, necessary, obligatory. It is also possible to add a degree of urgency and/or a source of the task (manual, AOC, ATC, FMS, other system).

The task creation 20 can comprise a step of entering a task parameter or parameters relating to a piece of navigation information on a second man-machine interface MMI 56, by an operator, for example a member of the crew. The task creation can comprise a step of extraction, by means of extraction means EXT 57, of at least one parameter relating to a piece of navigation information stored in a database BDD, 58. The database BDD, 58 is advantageously structured such that it is possible to extract and differentiate the different task parameters associated with a piece of information.

A task can also be created on reception of a numerical instruction (relating to a NOTAM or to a navigation instruction) coming from an external system EXT 15 in communication with the means for creating tasks 50 as will be seen below. In this case, the creation step 20 comprises a step, which is not shown, of interpretation of numerical instructions by means of interpretation means INTERP 59 receiving numerical instructions (from a CMU) in the form of textual of predefined structure and extracting the task parameters present in these messages. The different parameters associated with a piece of information can be obtained by one of more of the methods listed above (entry, interpretation of numerical instructions, extraction from a database).

The task creation step 20 comprises a step, which is not shown, of determination of a predicted time of meeting the execution condition by means of the prediction means PREDH 51. When the task variable is of the time type, the predicted time can correspond to the time entered by an operator (or extracted by the interpretation function) as a variable. In the contrary case, the predicted time is calculated from the task variable and the future route plan. The future route plan is the portion of the route plan starting at the current position of the aircraft at the current time. The portion of flight path contained in the future route plan is called the future flight path.

The method according to the invention comprises a step 21 of detection of a possible inconsistency between a task and the route plan or the future route plan by means of means INC, 52. The inconsistencies are detected on the basis of the task variable and of the route plan or the future route plan. In the continuation of this description the explanations for the detection of an inconsistency with the future flight plan are given. These explanations can be transposed to the detection of inconsistency with the route plan. The detected inconsistencies with the future route plan are more reliable on using the future route plan because the detected inconsistencies necessarily apply to the continuation of the mission.

When the task is created on the basis of a navigation instruction, it is inconsistent with the future route plan when the variable has no intersection with the future route plan or when it is situated at a distance D from the future flight path greater than a predetermined distance. When the variable is a position variable, an inconsistency is detected when the variable is not situated on the future flight path or close to the future flight path. When the position is defined solely by the altitude or the lateral position (the component of the position in a horizontal plane), the position is not situated on the future portion of the flight path if the altitude, or lateral position respectively, is not contained on the future portion of vertical, or respectively lateral, flight path. When the position is defined by a waypoint on the flight plan, it is not situated on the future flight path if it is not among the future waypoints. A variable is situated close to the future flight path when it is situated at a distance D from the latter which is less than a predetermined distance.

When the variable is of the geographic zone type, an inconsistency is detected when the variable does not intersect the future flight path or is not situated close to the latter. When the variable is of the major event of the flight type, an inconsistency is detected when it is not included in the future events of the route plan. This is, for example, the case when it corresponds to a flight phase prior to the current flight phase. When the variable is of the time type, an inconsistency is detected when it is not included between the current time and the predicted end of mission time. When the variable is of the speed type, an inconsistency is detected when it is not included in the range of speeds associated with the future route plan.

For the following information of the NOTAM type: "AIRSPACE R166B CLOSED BETWEEN 200903031300 AND 200903031800", signifying that the airspace R66B is closed between 13.00 on 3 Mar. 2009 until 18.00 on 3 Mar. 2009. The interpretation means associate the following parameters with this NOTAM: a variable (name of an airspace R66B), a type of variable (geographic space), an instruction related to the variable "closed". An inconsistency is detected between the route plan and the NOTAM when the flight path intersects the variable. Advantageously, the interpretation means associate a period of validity corresponding to the period from 13.00 on 3 Mar. 2009 to 18.00 on 3 Mar. 2009. An inconsistency is detected between the route plan and the NOTAM when the flight path intersects (or passes close to) the variable during the period of validity.

In brief, when the instruction corresponds to a prohibition of the closed or unusable or out of service type, an inconsistency with the route plan is detected when the variable is included in the route plan (possibly during the associated validity period). Taking the following NOTAM, "LFBZ-STAR MAGEC3M UNUSABLE", signifying that the approach procedure "MAGEC3M" is unusable (type of variable) at BIARRITZ (LFZB.), it is inconsistent with the future route plan if the future route plan includes the MAGEC3M approach procedure. This can be transposed to any type of navigation information.

Advantageously a task comprises a context parameter. Advantageously, an inconsistency with the future route plan is detected if the variable is included in the future route plan and if the context of the aircraft (that is to say the measured value, of the magnitude associated with the context parameter at the current time) is different from the context parameter. Taking the following NOTAM, "LFBD-APPR FREQUENCY CHANGED TO 128 MHZ" signifying that the frequency of the approach airspace LFBD-APPR has changed to 128 MHZ, if the prepared frequency is different from 128 MHZ and if the route plan includes the variable, then an inconsistency message must be displayed.

The step of determination of a predicted time and the step of detection of inconsistencies are advantageously repeated regularly throughout the lifetime of the task. In fact, the predicted time and the detected inconsistencies depend on the position of the aircraft and on the route plan. However, the route plan is modified by the accomplishment of a task, which potentially modifies the predicted time and the detected inconsistencies. A task is active as long as the task completion condition is not met.

Advantageously, the means INC 52 of detection of inconsistency identify the nature of the detected inconsistency. For example, the flight phase associated with the information is prior to the current flight phase or inexistent. When an inconsistency is detected, a message relating to the inconsistency is transmitted to first display means AT 53 of a centralized warning management system FWS 54 in order to display 22 an inconsistency message on a first man-machine interface MMI, 55.

The detection of inconsistency can also be carried out on the basis of the result of the predicted time calculation. In the case of failure of the predicted time calculation, it is considered that there is an inconsistency (which means that the variable is not included in the future flight plan). This inconsistency detection mode must be adapted in the case of NOTAMs in order to take account of the associated instruction.

Once the task has been created, it is also transmitted to task sequencing means ORD which sequence 23 the tasks. The sequencing step consists in inserting the created task into a list of tasks. A sequencing criterion can, for example, be a chronological criterion, taking account of the predicted time. The sequencing task is advantageously updated regularly.

The sequencing means 61 advantageously correspond to a sequencing function of an FWS centralized warning management system 54. An FWS 54 conventionally receives warnings in the case of failure or risk of failure of a flight management and control system (flight control system, hydraulic system, electrical network, computers). The FWS conventionally comprises functions for managing a list of alarms, including a function of sequencing the list of alarms. It then displays the different sequenced warnings and the solution procedures to be applied by the crew in response to the warnings on one or more dedicated screens. The mechanisms of managing a list of alarms can easily be adapted to the management of a list of tasks and possibly to the inconsistency messages. The list of tasks can be inserted in a list of alarms. The sequenced list of tasks can be displayed 24 to the crew on a third man-machine interface MMI 62 by second task display means 63 of the FWS. Advantageously, the third MMI 62 is the same MMI as the first MMI 55 so that the messages applicable to the inconsistency messages and the tasks are displayed in a centralized manner. For example, the inconsistency messages and the tasks are displayed on the same screen of the MMI. It is for example a single MMI connected to the FWS. For example, a message comprising one or more parameters of the task is displayed.

Advantageously, the method according to the invention comprises a step, which is not shown, of filtering tasks by means of task filtering means which are not shown. The filtering is carried out according to a filtering criterion depending on at least one task parameter in order to display only the tasks and/or the inconsistency messages meeting the filtering criterion. For example, the criterion can consist in transmitting only the most urgent tasks to the display means. The most important information in a specified context is made available to the pilot.

The method according to the invention can comprise a task execution step 25. A task execution function EX 64 extracts a task from the task list when the condition for execution of the task is met. The task execution function EX 64 can then display the task in a fourth MMI 65. The task execution function can also transmit the task to be executed to the FMS or to the OANS, if it is a task that can be automated by one of these systems. This is, for example, the case of navigation instructions for which the FMS can execute the task while piloting the aircraft by means of the automatic pilot. The task can be deleted once completed. The task execution step 25 can also be carried out by the crew on the basis of a task execution procedure displayed by the FWS when the condition for execution of the task is met.

Figure 4:
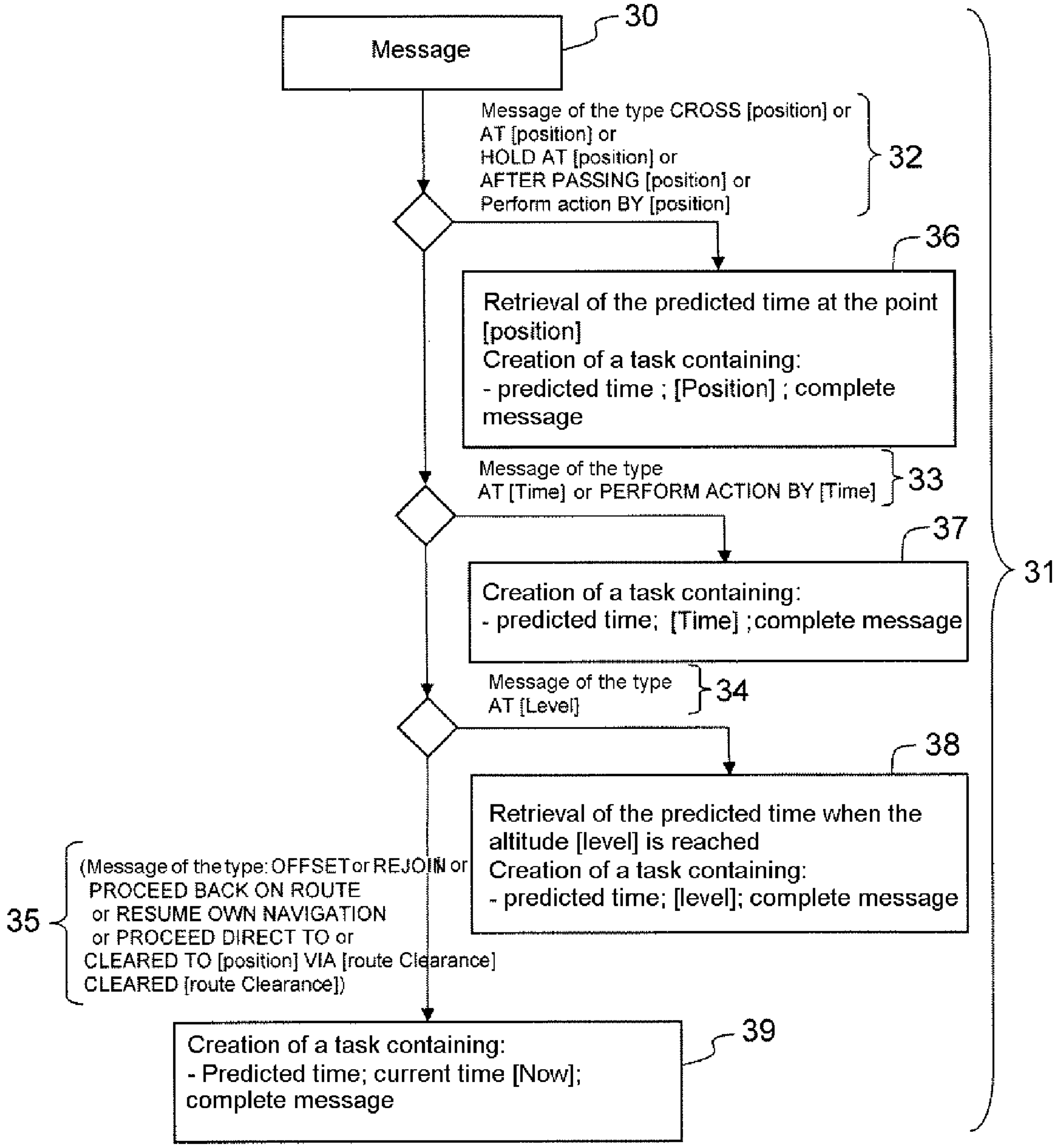
FIG. 4 shows an example of processing a task creation step by the method according to the invention.

FIG. 4 shows different processings implemented, in flight, to create a task on reception of instructions coming from an external system such as an AOC or an ATC. The instructions can be received in the form of textual messages 30 having predefined types. Depending on the types of messages received, the tasks are not created in the same way. For example, if the message 30 is of the first types 32: CROSS; AT; HOLD AT; AFTER PASSING; PERFORM ACTION BY; followed by a position indication and an instruction, then the creation 36 of a first task is carried out by interpreting the textual message 30 by extraction of the variable which in this case is the position indication, the instruction (corresponding to the complete message) and possibly adding to it the type of task (navigation instruction). The predicted time is determined by retrieving the predicted time of the aircraft passing the position on the flight plan.

If the message is of the following second types 33: AT; PERFORM ACTION BY, and comprises: a time, referenced TIME, and a complete textual message, then the task creation step 37 is the same as the preceding step whilst taking account of the fact that in this case the variable is the time TIME and the predicted time is the TIME extracted from the message. If the message is of the third type 34: AT followed by an altitude referenced "level", then the task creation step 38 is the same as the preceding step whilst taking account of the fact that the variable in this case is the altitude "level" and the predicted time determination step differs with respect to the step used for the first types of messages. In fact, the predicted time is retrieved from the flight plan; it is the time at which it is predicted to reach the altitude on the flight plan.

If the message is of the following fourth types 35: OFFSET; REJOIN; PROCEED BACK ON ROUTE; RESUME OWN NAVIGATION; PROCEED DIRECT TO; CLEARED TO, followed by a position, followed by VIA, followed by a "ROUTE CLEARANCE"; CLEARED, followed by a "ROUTE CLEARANCE"; then a fourth created task 39 comprises a predicted time corresponding to the current time, a time variable showing "now" and the complete textual message 30.

Thus the method according to the invention makes it possible to at least partially automate the taking into account of the messages coming from external systems like an ATC or an AOC and releases the crew from the task of initial analysis of the message. Moreover, if the instruction does not have to be executed (or taken into account) immediately, the method advantageously makes it possible to remind the crew of the instruction at the appropriate time.

Figure 5B:
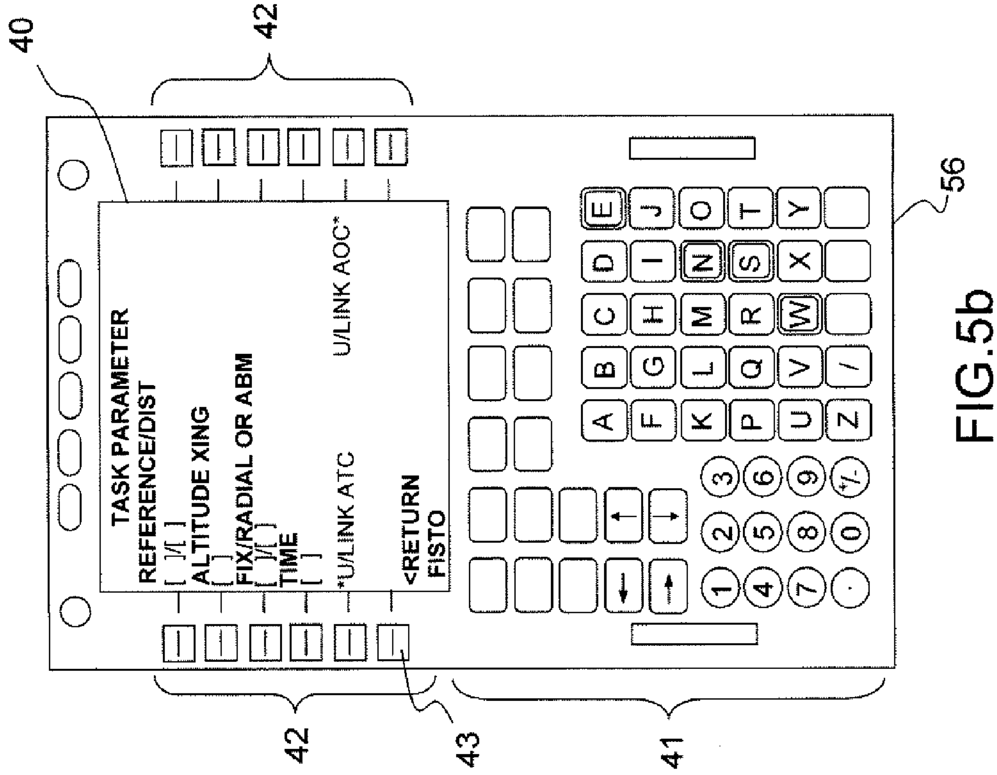
FIGS. 5*a* to 5*e* show a task creation example.
Figure 5A:
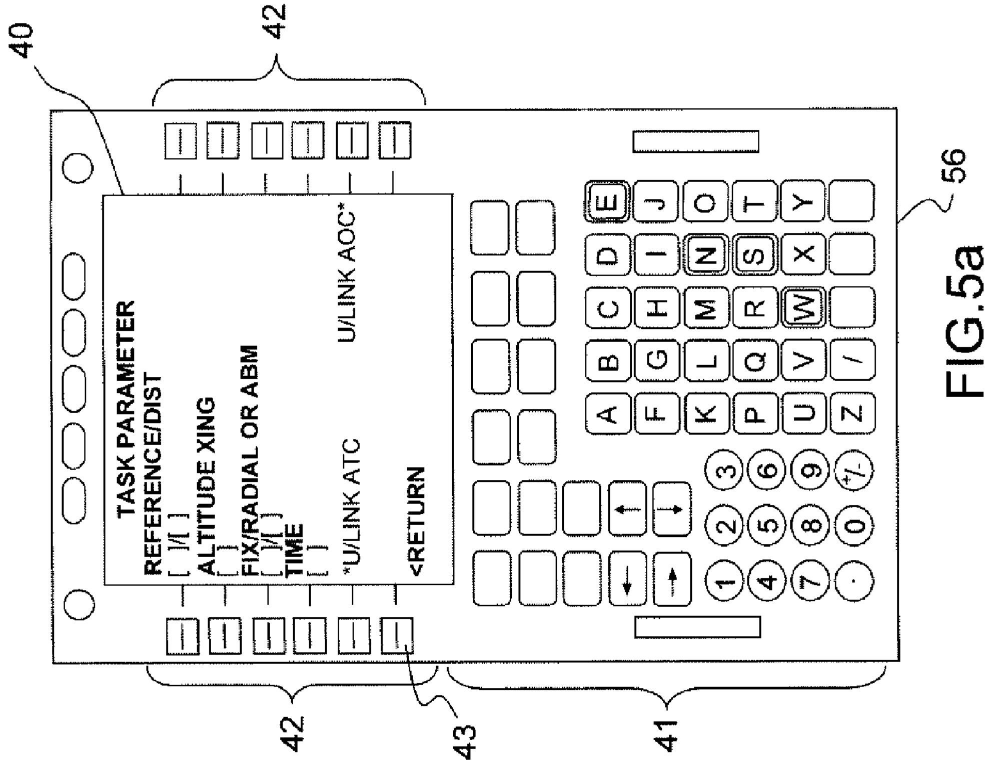
Figure 5D:
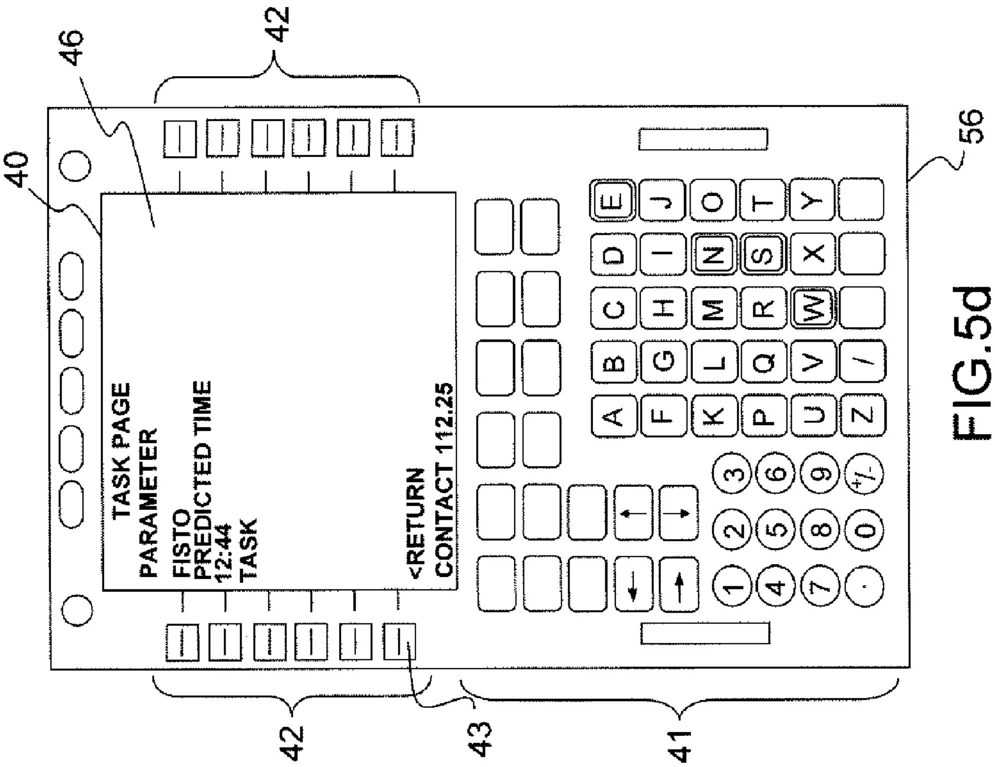
Figure 5C:
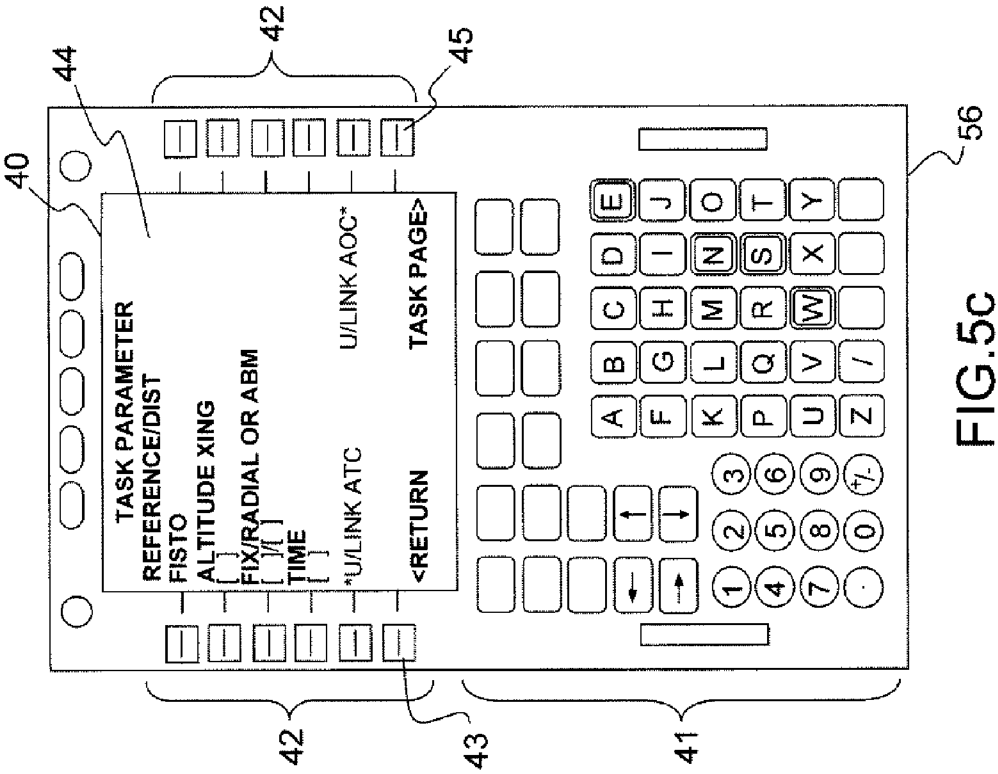

FIGS. 5*a* to 5*e* show an example of manual entry of parameters of a task via the second MMI 56, which is in this case the MMI dedicated to the FMS 1. The MMI dedicated to the FMS is in this case an onboard MCDU ("Multipurpose Control Display Unit") console. Via the second MMI 56, for example, the operator can select a variable and associate an instruction with it. The instruction can be optional if the operator wishes only an alarm when the condition specified by the variable is met. The onboard console notably comprises a display panel 40, a keypad 41 comprising alphanumeric information input keys and keys for accessing functions of the FMS 1 and, on two vertical sides of the panel 40, keys 42 for accessing items displayed on the display panel 40. In FIG. 5*a*, the panel 40 is displaying a form for the entry of parameters of a task, "TASK PARAMETER", for the manual creation of a task 20. The form comprises several items detailed hereafter. A task can therefore be created for example on reception of a message coming from an external system: "U/LINK ATC" when the message is coming from an ATC system or "U/LINK AOC" when the message is coming from an AOC system.

Figure 5E:
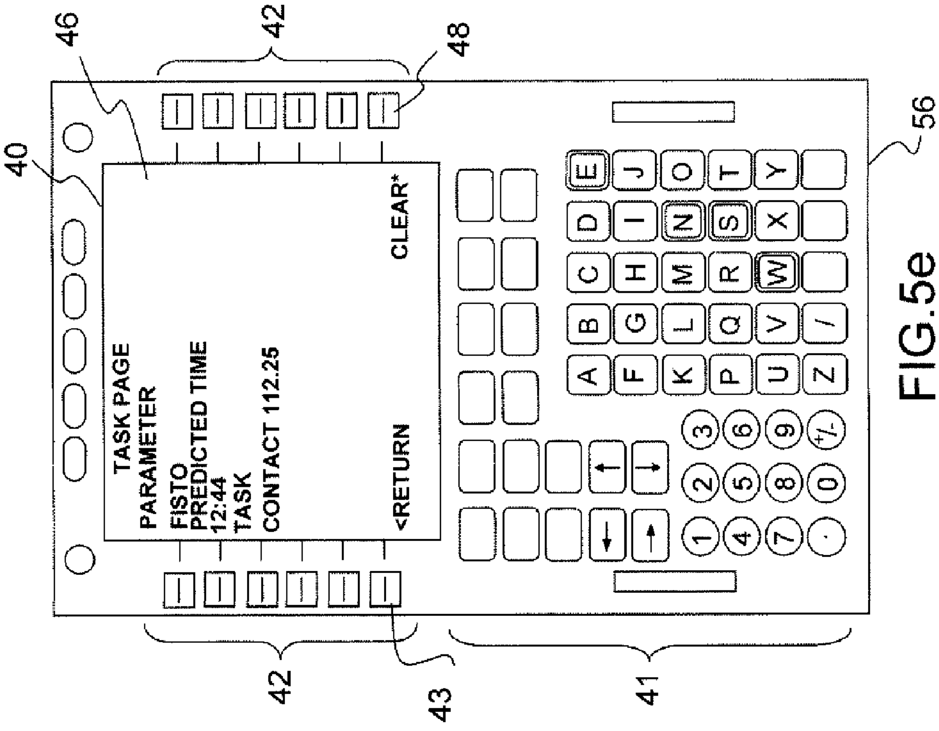

The parameter can be a position by reference parameter called "REFERENCE/DIST" (where REFERENCE is a point known by the FMS system and DIST is a distance on the flight path with respect to this point), an altitude parameter called "ALTITUDE XING" (signifying the crossing of an altitude), a position parameter identified by "FIX/RADIAL OR ABM" (FIX being a point known by the FMS system, RADIAL being a radial in degrees coming from this point crossing the flight path, and ABM being a particular radial which starts from the point FIX and which intersects the flight path according to an orthogonal projection), a time "TIME". A first item "RETURN" makes it possible to validate an entry by an operator by pressing a first button 43, which is among the access keys 42, the said first button 43 being situated beside the first item "RETURN". In FIG. 5*b*, an operator has entered a name of a reference at a position: "FISTO". The operator validates the entry by pressing the first button 43 and obtains a screen 44, shown in FIG. 5*c*. A second button 45, among the access buttons 42, is situated beside a second item "TASK PAGE". When the operator presses the second button 45, the task is created and a page 46, called "TASK PAGE", shown in FIG. 5*d*, appears on the display panel 40. The page 46 shows the operator the task created in the form of a list comprising an attribute "PARAMETER" whose value is FISTO and represents the variable of the task, an attribute "PREDICTED TIME" representing the predicted time at the point, an attribute "TASK" representing the task instruction. The operator can enter an instruction, for example "CONTACT 112.25" representing a frequency to contact. The operator presses the first button 43 in order to validate the entry of the instruction. Once validated, the instruction appears as a third item "TASK", as shown in FIG. 5*e*. A fourth item "CLEAR" then appears on the display panel 40, making it possible to delete the task created by the operator. The display of the task can consist of displaying the predicted time followed by the instruction. An inconsistency can be detected when FISTO is not part of the flight plan or if the prepared frequency is different from 112.25 HZ. The FWS can display the message "FISTO NOT IN ACTIVE FPLN" signifying that FISTO is not included in the flight plan.

Figure 6:
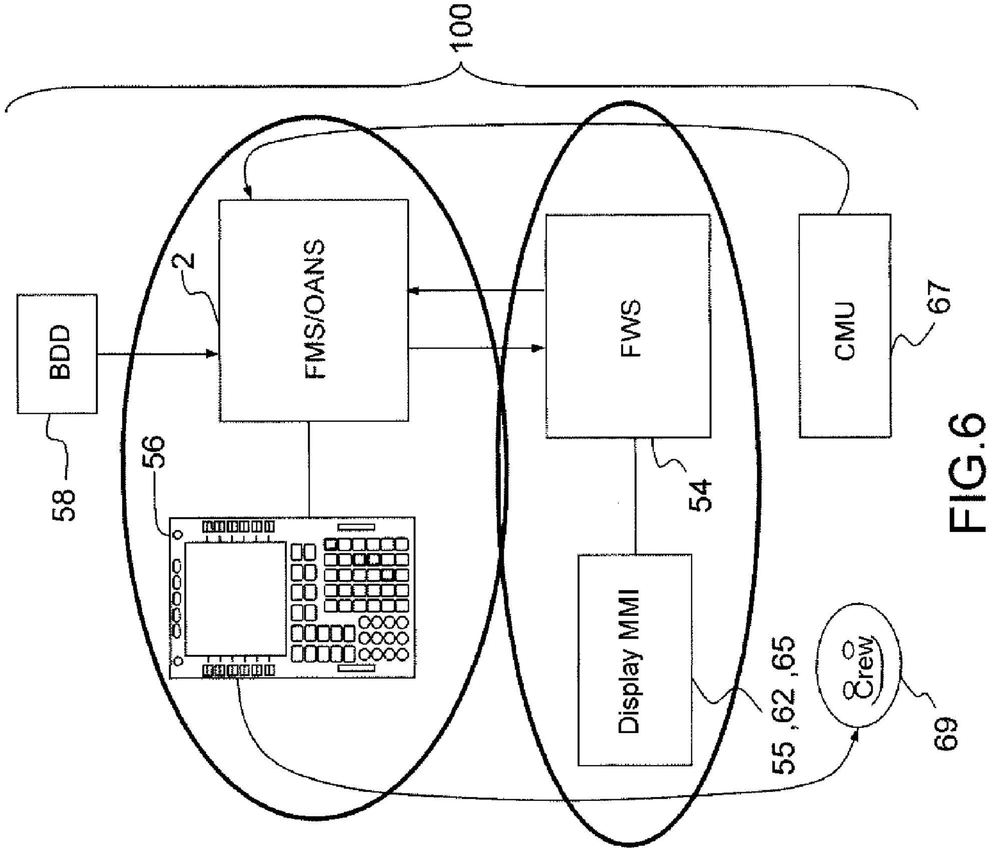
FIG. 6 shows an example of architecture of the system according to the invention.

In FIG. 6, there is shown an example of architecture of the system according to the invention comprising an FWS, 54, an FMS/OANS route management system 2 comprising an FMS and/or an OANS as well as a CMU 67 connected to the FMS/OANS. The detection of inconsistency and the determination of the predicted time can be carried out by the route plan construction means. For example, for a position variable, the means 8, 10 for calculating the flight path are capable of carrying out these calculations.

The second input MMI 56 is an MMI dedicated to the FMS (and/or to the OANS) which in this case is an onboard MCDU console. The display MMIs 55, 62, 65 are grouped in a single MMI dedicated to the FWS, 54. The means of interpretation 59, prediction 51, inconsistency detection and extraction 57 are contained in the FMS. As a variant, the FMS comprises a portion of these functions. In another variant, these means are included in a dedicated task management system.

The system according to the invention can comprise a fifth man-machine interface MMI, connected to the CMU 67, making it possible for the crew to control the transmission, to the task creation means, of the numerical instructions sent by external systems EXT, 15 to the CMU communication management unit 67.

The MMIs present in the system can be replaced by an integrated MMI. The integrated MMI routes the entered data to the correct system: FMS 1, FWS or CMU. The integrated MMI also displays all of the data to be displayed. The use of an integrated MMI allows the crew to have all of the information and all of the interfaces it needs in order to manage the tasks on the same MMI.

What is claimed is:

1. A centralized navigation information management system installed on board an aircraft which is in a current position at a current time, the aircraft comprising a warning management system and a route management system, the route management system being configured to create a current route plan and a future route plan, the current route plan comprising a current flight path for the aircraft and the future route plan comprising a future flight path corresponding to a part of the current route plan beginning at the current position and at the current time, the centralized navigation information management system comprising one or more computers configured to:

create a task comprising at least one task parameter relating to an item of navigation information, the at least one task parameter including a task variable corresponding to a condition of execution of the task, the task variable corresponding to a predetermined value of a magnitude corresponding to a type of the created task;

extract the at least one task parameter from a numerical instruction received from an external system;

detect an inconsistency between the created task and the current route plan or the future route plan when an inconsistency is determined between the task variable and the current route plan or the future route plan; and transmit, when the inconsistency between the created task and the current route plan or the future route plan is detected, a message relating to the inconsistency to a centralized warning management system configured to display the message on a first man-machine interface.

2. The system according to claim 1, wherein the task further comprises one or more task parameters having one or more of validity periods, a type of variable, a context parameter, a type of task, a degree of urgency, a source of the task, and a task instruction.

3. The system according to claim 1, wherein the inconsistency between the task variable and the current route plan or the future route plan is detected when the task variable does not intersect with the current route plan or the future route plan, or is situated at a distance greater than a predetermined distance from the current flight path or the future flight path.

4. The system according to claim 2, wherein the task instruction corresponds to a prohibition, and the inconsistency between the task variable and the current route plan the future route plan is detected when the task variable is in the current route plan or the future route plan, or is situated at a distance less than a predetermined distance from the current flight path or the future flight path.

5. The system according to claim 2, wherein the inconsistency between the task variable and the current route plan or the future route plan is detected when the task variable intersects the current route plan or the future route plan, or is situated at a distance greater than a predetermined distance from the current flight path or the future flight path, during at least a period of flight or when context of the aircraft is different from the context parameter.

6. The system according to claim 1, wherein the one or more computers are further configured to determine a predicted time for completion of the condition of execution.

7. The system according to claim 1, wherein the one or more computers comprise a second man-machine interface configured to receive the at least one task parameter or to extract the at least one task parameter from a database.

8. The system according to claim 1, wherein the route management system comprises one or more of a flight management system and an airport navigation system.

9. The system according to claim 7, wherein the centralized warning management system further comprises a task sequencer configured to insert the created task in a list of sequenced tasks, and the centralized warning management system is further configured to display the list of sequenced tasks on a third man-machine interface or execute the created task.

10. The system according to claim 1, further comprising a filter configured to filter tasks according to a filtering criterion based on the at least one task parameter, so only those tasks complying with the filtering criterion are displayed on a third man-machine interface or those messages complying with the filtering criterion are displayed on the first man-machine interface.

11. A centralized navigation information management method for an aircraft which is in a current position at a current time, the aircraft comprising a warning management system and a route management system, the route management system being configured to create a current route plan and a future route plan, the current route plan comprising a current flight path for the aircraft and the future route plan corresponding to a part of the current route plan beginning at the current position and at the current time, the method comprising:

creating a task comprising at least one task parameter relating to an item of navigation information, the at least one task parameter including a task variable corresponding to a condition of execution of said task, the task variable corresponding to a predetermined value of a magnitude corresponding to a type of the created task;

determining a predicted time of completion of the condition of execution;

extracting the at least one task parameter from a numerical instruction received from an external system;

detecting an inconsistency between the created task and the current route plan or the future route plan when an inconsistency is determined between the task variable and the current route plan or the future route plan; and transmitting, when the inconsistency between the created task and the current route plan or the future route plan is detected, a message relating to the inconsistency to a centralized warning management system configured to display the message on a first man machine interface, wherein the creating, determining, extracting, detecting, and transmitting are performed by one or more computers.

12. The system according to claim 1, wherein the centralized warning management system is different from the centralized navigation information management system.

13. The method according to claim 11, wherein the centralized warning management system is different from the centralized navigation information management system.

14. The system according to claim 1, wherein the centralized warning management system is outside of the aircraft.

15. The method according to claim 11, wherein the centralized warning management system is outside of the aircraft.

* * * * *